United States Patent [19]

James

[11] 4,253,854

[45] Mar. 3, 1981

[54] DUST FILTER APPARATUS

[75] Inventor: Granville C. James, Burton on Trent, England

[73] Assignee: Coal Industry (Patents) Limited, London, England

[21] Appl. No.: 399,338

[22] Filed: Sep. 20, 1973

[30] Foreign Application Priority Data

Sep. 29, 1972 [GB] United Kingdom ............... 45042/72

[51] Int. Cl.³ ............................................ B01D 47/06
[52] U.S. Cl. ........................................ 55/227; 55/229;
55/233; 55/257 PV; 55/431; 55/481; 261/98;
261/100
[58] Field of Search ................. 55/271, 233, 240, 259,
55/481, 482, 485, 495, 501, 527, DIG. 31, 258,
486, 487, 227–229, 257 PV, 242, 431; 261/98,
100

[56] References Cited

U.S. PATENT DOCUMENTS

| 342,099 | 5/1886 | Howe | 55/486 X |
|---|---|---|---|
| 808,897 | 1/1906 | Carrier | 55/257 PV |
| 1,483,379 | 2/1924 | Reed | 55/485 |
| 1,564,075 | 12/1925 | Lakin | 55/228 X |
| 1,614,647 | 1/1927 | Brooks | 55/228 |
| 2,022,740 | 12/1935 | Rowell | 55/259 X |
| 2,057,568 | 10/1936 | Gerard | 55/481 |
| 2,057,579 | 10/1936 | Kurth | 55/233 X |
| 2,107,653 | 2/1938 | Strobell | 55/481 X |
| 2,130,630 | 9/1938 | Kolstad | 55/527 X |
| 2,197,004 | 4/1940 | Meyers | 55/259 |
| 2,199,632 | 5/1940 | Keyes | 55/233 |
| 2,387,473 | 10/1945 | Spitzka | 55/242 X |
| 3,138,441 | 6/1964 | Krantz | 55/227 |
| 3,180,244 | 4/1965 | Mescher | 55/233 X |
| 3,387,889 | 6/1968 | Ziemba et al. | 55/233 |
| 3,406,498 | 10/1968 | Wisting | 55/467 X |
| 3,461,650 | 8/1969 | Mildh | 55/431 X |
| 3,540,190 | 11/1970 | Brink, Jr. | 55/97 |
| 3,618,301 | 11/1971 | Handman | 55/259 |
| 3,748,828 | 6/1973 | Lefebvre | 55/240 X |
| 3,795,089 | 3/1974 | Reither | 55/233 |
| 3,802,158 | 6/1973 | Ohle | 55/228 |

OTHER PUBLICATIONS

Gas Absorbers for Controlling Industrial Air Pollution, Buffalo Forge Co.

*Primary Examiner*—David L. Lacey
*Attorney, Agent, or Firm*—James Creighton Wray

[57] ABSTRACT

Dust filter equipment includes a fibrous mat filter (37) having a low fibre density and a low loft so that when water is fed onto the filter it saturates the filter throughout its thickness and flows freely down the filter to form an effectively continuous body of water having a thickness virtually equal to the thickness of the mat filter.

16 Claims, 11 Drawing Figures

DUST FILTER APPARATUS

This invention relates to dust filter apparatus.

In particular, although not exclusively, the invention relates to dust filter apparatus for use in underground mines where it is known to induce an air flow away from a dust generating source, for example, a rock cutting head or a conveyor discharge station and to pass the induced air flow through the dust filter apparatus to remove particles of dust from the air.

Such dust filter apparatus which has been proposed for use with an underground coal or rock mining machine, comprised a fibrous mat filter and a nozzle which discharged a continuous spray of water onto the upstream facing surface of the mat filter, the invention of the spray being to continuously wash dust particles off the mat filter and so keep the filter clean and thereby eliminate the need for frequent replacement of the mat filter as is necessary when the mat filter is not sprayed with water. Fibrous mat filters when wet tend to form a relatively thick body of water which is contained in the passages of the fibrous mat filter by the fine fibres. With such filters their dust collection properties tend to be due to contact between the water in the body of water and the dust particles drawn through the mat filter by the air flow. As will be seen later the actual conditions of the water in the body contained by the fibres varies depending upon the form of the fibrous mat filter.

The prior known fibrous mat filters which were sprayed with water were high fibre density filters initially intended for use in the dry dust filter apparatus witout the water spray. Such high fibre density fibrous mat filters have the fibres packed tightly or densely together to form narrow tortuous passages within the mat filter. When the fibrous mat filter becomes wet, these narrow tortuous passages produce a capillary action which tends to absorb or draw water into the passages away from the outer surface of the mat filter. The water drawn into these passages tends to form a zone of stationary or slow moving water which tends to form a restriction in the passages. Thus a high fibre density mat filter has a high resistance to air flow and consequently a large pressure difference is required to induce a desired quantity of air flow through the clean dust free, wet mat filter.

As more water is sprayed onto the high density mat filter, the virtually stationary water remains absorbed within the mat filter while the water freshly sprayed onto the mat filter tends to run down the upstream surface of the mat filter. Upon dust particles initially being delivered onto the upstream surface of the mat filter the majority of particles become wetted and are discharged with the water running down the mat filter into a collection or settling tank. However, some of the particles are drawn towards the zone of virtually stationary water where they collect in the narrow tortuous passages, the velocity of the water in the zone being insufficient to wash the dust particles out of the passages and off the mat filter. As the dust filtering process continues and more particles move towards the zone of virtually stationary water, the passages rapidly tend to become blocked with the particles. Consequently, the resistance of air flow through the mat filter increases with a corresponding increase in pressure drop across the filter. Thus, the operational life of the high fibre density fibrous mat filter is short and it is necessary to change the mat filter at frequent intervals of time. Since the replacement of the mat filter usually interferes with an associated mining operation the mat filter tended to be changed less frequently than was necessary for efficient operation.

A further disadvantage of high fibre density fibrous mat filters is that the mat filter when dry and clean still efficiently collects dust particles. Thus if, in use, the water spray is cut off, say for example due to a broken supply hose, the filter efficiently collects the dust particles from the air flow without being continuously sprayed. Consequently, the passages of the mat filter tend to become blocked more rapidly and so the resistance to air flow through the mat filter would increase more rapidly than expected. Therefore, even with regular replacement of the mat filter there is still a danger that the dust filter apparatus can operate in a potentially dangerous condition.

In order to try and overcome the disadvantages encountered with high fibre density fibrous mat filters it was proposed to use low fibre density or relatively open mat filters of high loft, for example a mat thickness of over three quarters of an inch. Again with high loft fibrous mat filters it was intended to continuously spray the upstream surface with water. Unfortunately, in trials it was found that when using acceptable quantities of water, the water tended only to penetrate into the upstream margin of the mat filter. When a larger quantity of water was sprayed into the mat filter, instead of saturating all the mat filter the additional water tended to form streams running down the upstream surface of the mat filter. A further disadvantage of high loft filters is that the zone existing between the wet upstream margin and the dry downstream margin tends to be damp. The water in this damp zone tends to be stationary rather than flow down the mat filter. Thus any dust particles drawn into the damp zone tend to stick to the mat filter and not be washed away by the low velocity water flow in the damp zone. Thus, the passages of the mat filter tend to rapidly become blocked.

Consequently high loft filters have the disadvantage that, in use, dust particles tend to be retained by the mat filter and block up the passages through the mat filter.

From the above description it will be appreciated that prior known fibrous mat filters when subjected to water sprays have many disadvantages which have restricted the adoption of the fibrous mat filters in favor of dust filter apparatus comprising relatively coarse metal screens with relatively short, large cross-sectional area apertures. These metal screens are sprayed with water and dust particles tend to be removed from the air flow by impaction with the relatively thin broken curtain of water on the flooded screen. Such dust filter apparatus has the advantage that the metal screen does not have to be frequently replaced but, unfortunately, it tends not to be as efficient as the previously mentioned fibrous mat filter apparatus which as previously stated tend to form a continuous relatively thick body of water contained in the fine fibres compared with the relatively thin broken curtain of water associated with metal screens.

An object of the present invention is to provide improved dust filter apparatus which overcomes or reduces the above mentioned disadvantages.

According to the present invention dust filter apparatus comprises a hollow chamber providing a gaseous flow duct, a filter unit including a fibrous mat filter arranged across the duct, and means for spraying liquid into the gaseous flow duct, the mat filter having a fibre density such that the mat filter tend not to retain the liquid by capillary action and permits flow of liquid throughout the thickness of the filter in the directions parallel to, and transverse to, the direction of gaseous flow and having a loft such that the liquid from the means for spraying liquid saturates the whole of the mat filter, the arrangement being such that, in use, an effectively continuous body of flowing liquid is formed across the gaseous flow passage, the body having a thickness virtually equal to the thickness of the mat filter.

Preferably, the mat filter unit comprises a pre-filter located on the upstream side of the fibrous mat filter.

Preferably, a driven fan is provided for inducing the gaseous flow through the filter unit.

Advantageously, the mat filter and the pre-filter are mounted in a frame.

Conveniently, the frame engages in a slide arranged transversely to the gaseous flow duct.

Preferably, the frame has a formation which engages a formation on the slide to ensure correct assembly of the dust filter apparatus.

Conveniently, a sealed settling tank is provided below the mat filter unit.

Advantageously, the dust filter apparatus comprises a pump for recirculating liquid from the settling tank to the nozzle means.

Preferably, a suction pipe section is provided in the settling tank for feeding liquid to the pump, the cross-sectional area of the suction pipe section being such that, in use, collected coarse particles tend not to be carried by the flow of liquid along the suction pipe.

Advantageously, the pump is drivably coupled to the fan drive.

Conveniently, the settling tank is provided with means for maintaining the level of liquid in the settling tank.

Preferably, the means comprises a valve which is connected to a liquid supply and which opens when the liquid level in the settling tank falls below a preselected level.

Preferably, the control valve feeds liquid into the settling tank through a pipe, at least the discharge portion of which extends in the direction of the settling tank floor so that, in use, liquid fed into the settling tank from the liquid supply scours the floor and urges dust particles which have settled on the floor towards discharge means for the removal of the collected dust particles.

Preferably, means are provided on the downstream side of the mat filter unit for removing liquid from the filtered air flow.

By way of example only, one embodiment of the present invention will be described with reference to the accompanying drawings, in which.

Figure 1:
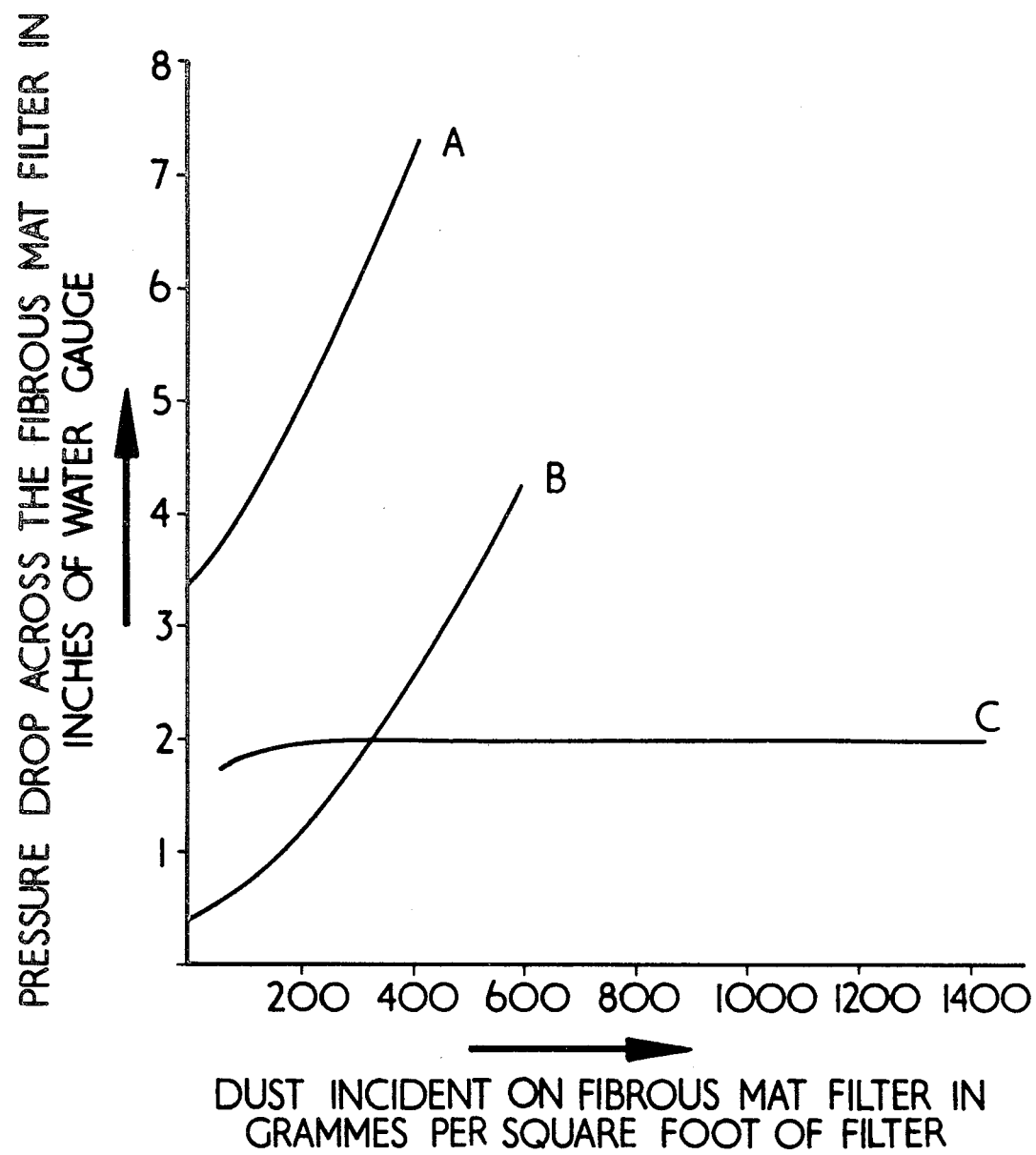
FIG. 1 is a set of graphs illustrating characteristics for three different forms of fibrous mat filter.

Referring to FIG. 1 which shows three graphs A, B and C illustrating the "pressure drop across the fibrous mat filter" against the "dust incident on the mat filter" characteristics for three different forms of fibrous mat filter, all three mat filters being continuously sprayed with water. The forms of dust filter apparatus associated with graphs A and B are prior known whilst the mat filter associated with graph C is according to the present invention.

Throughout the testing period of each of the three forms of mat filters a constant air velocity of five meters per second was maintained through the mat filter and three quarters of a gallon per minute of water was fed onto the mat filter for each square foot of mat filter surface area. Dust particles were introduced into the air flow on the upstream side of the mat filter at a constant rate.

The form of the mat filter associated with Graph A was a high fibre density fibrous mat filter, the fibres being densely packed together so that tortuous narrow passages are provided through the mat filter. The mat filter had a low loft having a thickness of approximately one eight of an inch.

As can be seen from Graph A, the clean filter has a relatively high resistance to air flow indicated by the relatively high pressure drop across the filter (almost three and a half inches of water gauge) with zero dust incident on the filter mat. This is due to the resistance to air flow through the tortuous narrow passages and to water which because of the capillary action of the passages becomes absorbed into the mat filter and lodges in the passages and thereby further increases the resistance to air flow through the passages. Also, because the water lodged in the passages is held there by capillary action, the high fibre density fibrous mat filter tends to prevent the water flowing through the filter both in the directions parallel to and tranverse to, the direction of air flow. Thus once the tortuous narrow passages of the high fibre density fibrous mat filter contain water there is a tendency for a zone to be formed where the water tends to remain stationary and not to flow through the filter. As more water is sprayed onto the high fibre density mat filter it tends not to penetrate into the passages which are already full of water but flows down the upstream surface of the mat filter.

When dust particles are fed into the air stream the majority of the particles become wetted and are removed or washed from the mat filter by the water flowing down the upstream facing surface of the mat filter. However, a proportion of the dust particles find their way into the passages in the zone of the mat filter containing the stationary or slow moving water where the velocity of the water is insufficient to carry the particles. Thus these dust particles tend to stay in the passages and are not washed off the filters. As more dust particles are fed into the air flow, an increasing number find their way into the passages which thereby rapidly become blocked with the particles.

Consequently, the pressure drop across the high fibre density fibrous mat filter increases rapidly and by the time two hundred grams of dust have been fed onto each square foot of filter the pressure drop across the filter is approximately five inches of water gauge. As can be seen from the graph A upon more dust being fed onto the filter the pressure drop across the filter rapidly increases. The rapid increase in the pressure drop across the high density mat filter and therefore, the rapid increase to air flow through the filter is due to the dust particles blocking in the tortuous narrow passages in the mat filter. It will be appreciated from Graph A that in order to use high fibre density fibrous mat filters it would be necessary to change the mat filter at very frequent intervals of time. Such frequent changing of the mat filter has not proved practical in use and as a result such mat filters are not popular despite their initial high dust collection efficiency when clean and free from dust particles.

Referring now to Graph B this shows a similar characteristic to Graph A except the form of fibrous mat filter is of a low fibre density and high loft, the mat filter thickness being approximately three quarters of an inch. The fibres of the mat filter are more widely spaced from one another than the first discussed mat filter so that the tortuous passages formed through the mat filter have a larger cross sectional area than those in the previously discussed mat filter. The passages of the mat filter associated with Graph B are of such a large cross-sectional area that little or no capillary action affects the flow of water through the mat filter and the water tends not to be absorbed by the mat filter.

The effect of the low fibre density of this second mat filter cn be seen by looking at Graph B where the pressure drop across the clean or dust free filter is low, i.e. less than one half of an inch of water gauge, the large cross-section passages providing little resistance to air flow. Since the mat filter is of a high loft the water sprayed onto the mat filter tends to penetrate into only the upstream margin of the mat filter. The downstream margin of the mat filter tends to remain substantially dry and a damp zone is formed intermediate the wet and substantially dry margins. Thus, as soon as dust is fed into the air flow, dust particles tend to collect in the damp zone and rapidly block the passages in this zone. The effect of this can be seen by the rapid increase in pressure drop across the filter as the dust fed onto the filter increases. (see Graph B). The effect is similar to that for the first discussed mat filter and therefore, the high loft fibrous mat filter has not been widely adopted for the reason previously given with reference to the high density fibrous mat filter.

Graph C shows the "pressure drop across the filter" against "dust incident on the mat filter" characteristic for a fibrous mat filter which is in accordance with the present invention, which has a low fibre density, the fibres being relatively widely spaced and which has a low loft, for example, the thickness of the mat filter being approximately one eight of an inch.

The low fibre density ensures that the mat filter tends not to absorb water, there being little or no capillary effect and water tends to flow freely through the mat filter in directions parallel to, and transverse to, the direction of air flow.

When water is fed onto the clean mat filter it flows, as previously explained, both through the mat filter and down the mat filter. Since the fibre density is low and relatively large cross-section passages are provided by the mat filter, water is free to flow down the mat filter throughout the whole thickness of the mat filter. Thus, no zone of effectively stationary water is formed in the mat filter. Instead a relatively thick body of water flows down the mat filter, the thickness of the body of water being substantially equal to the loft or thickness of the mat filter.

The effect of the relatively thick body of water flowing down the whole thickness of filter can be seen in Graph C where a relatively high pressure drop across the mat filter (compared to Graph B) is encountered with zero or low amounts of dust on the wet filter, the Graph C very rapidly approaches a maximum value. Thus even though the mat filter has a low fibre density the effect of the relatively thick body of water is to provide a resistance to air flow through the filter.

However, once a maximum value for the pressure drop across the filter is reached the pressure drop remains substantially constant irrespective of the amount of dust fed onto the filter. It can be seen from Graph C that the pressure drop across the mat filter remained constant at approximately two inches of water gauge throughout the testing period.

The reason for this constant reading is that because no zone of virtually stationary or slow flowing water exists in the mat filter there is no or little tendency for dust particles to remain in the mat filter. Throughout the whole thickness of the filter the velocity of the water is sufficient to wash the dust particles out of the passages and down the filter, a large proportion of the dust particles being discharged with the water falling from the bottom of the mat filter. The dust particles are constantly washed from the fibres of the mat filter and there is little or no tendency for them to be retained in and block the passages.

Thus dust filter apparatus constructed in accordance with the present invention comprising a low fibre density, low loft fibrous mat filter can be used continuously with a minimum of attention.

It should also be noted that because a low fibre density fibrous mat filter does not tend to collect dust particles when used dry, there is no danger of the pressure difference across the mat filter increasing to a dangerous condition if the water supply is cut off. If the water spray was inoperative the air would flow through the filter and be discharged from the apparatus uncleaned.

The dust filter apparatus will now be described in more detail with reference to FIGS. 2 to 11 of the drawings.

The dust filter apparatus comprises a hollow chamber 2 which provides an air flow duct extending the length of the dust filter apparatus. The ends of the chamber 2 have flanges 3 for the attachment of extension ducting (not shown). Air is induced to flow through the apparatus by a fan 4 having an impeller 5 located within the portion of the air flow duct adjacent to the inlet of the chamber 2, the inlet duct being provided with a guard screen 9 (see FIG. 3). The fan is driven by an electric motor 6 which is housed within the fan bifurcation between the upper and lower branches 7 and 8, the air flow duct being divided into upper or lower branches to accommodate the fan drive motor 6. The motor 6 is drivably connected through a mechanical drive mechanism 10 provided on the rear of the motor to a pump 11 which is conveniently housed alongside the motor 6. With such an arrangement the pump is housed within a protected zone and the one drive motor 6 drives both the fan and the pump.

The pump 11 recirculates water from a sealed collection or settling tank 12 through pipes 14 and 13 to a bank of three nozzles 16 located upstream of the fan adjacent to the duct inlet. The inlet section of the suction pipe 14 is located within the settling tank 12 and at least the portion 15 of the suction pipe 14 submerged in the water in the tank is of a sufficient open cross-sectional area to ensure that the upward velocity of the water in the pipe is insufficient for collected coarse particles in the tank to be carried by the water flow and thereby block the nozzles 16.

The water level in the settling tank 12 is kept substantially at a preselected level by a control valve 18 which is actuated by a floating ball 19 and which feeds water from water supply mains (not shown) via branch pipe 20 into a pair of discharge pipes 21. The discharge portion of each of the pipes 21 extends in the direction of the inclined tank floor 23 so that water discharging from the pipes 21 tends to scour the floor of the tank to urge settled dust particles towards a discharge valve 25. The inclination of the floor 23 also tends to assist flow of the settled dust particles towards the discharge valve 25.

The settling tank 12 is sealed from the atmosphere to ensure air is not exhausted from the air flow duct through the tank. By adopting a sealed settling tank it is possible to mount the tank immediately below the air flow ducting.

A filter unit 30 (see particularly FIGS. 8 to 11) is provided across the air flow duct above the settling tank 12. Across to the filter unit is by means of doors 31 provided in each side of the chamber 2. The filter unit comprises a rigid frame 33 which slides along a slideway provided by the chamber 2 and extending transverse to the direction of air flow. The base of the frame 30 has a recessed formation 34 which is 'off' set from the centre of the frame and which engages in a projecting formation 35 provided on the chamber slideway. The formations 34 and 35 ensure that the filter unit cannot be incorrectly assembled in the chamber 2. A handle 36 is provided on each side of the frame to facilitate removal of the filter unit.

A fibrous mat filter 37 is positioned across the rigid frame 33, the mat filter having a low fibre density and a low loft as previously discussed with reference to Graph C of FIG. 1. The mat filter 37 is supported by a mesh of rigid members 38 secured between the sides of the frame 33 and releasably secured to the mat filter by spring clips (not shown).

A rigid pre-filter or screen 40 is also provided across the rigid frame 33 on the upstream side of the mat filter 37. The pre-filter 40 removes coarse particles which otherwise may have damaged the fibrous mat filter and which fall into the settling tank 12 via recesses 42 formed in the base of the frame 33.

Two series of holes 41 are provided in the lower side of the frame 33 to permit free flow of water discharging from the filters 37 and 40 into the settling tank 12. A plurality of baffle plates 43 (see FIG. 2) are provided to prevent the air flow short circuiting below the filter unit 30 and below a plurality of catchment plate assemblies 44 provided within the air flow ducting on the downstream side of the filter unit.

Figure 4:
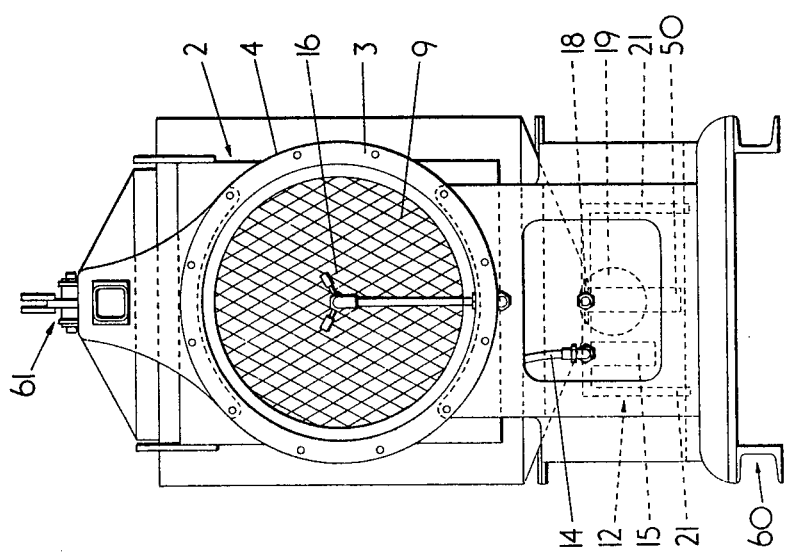
FIG. 4 is a side detail of FIG. 2.
Figure 5:
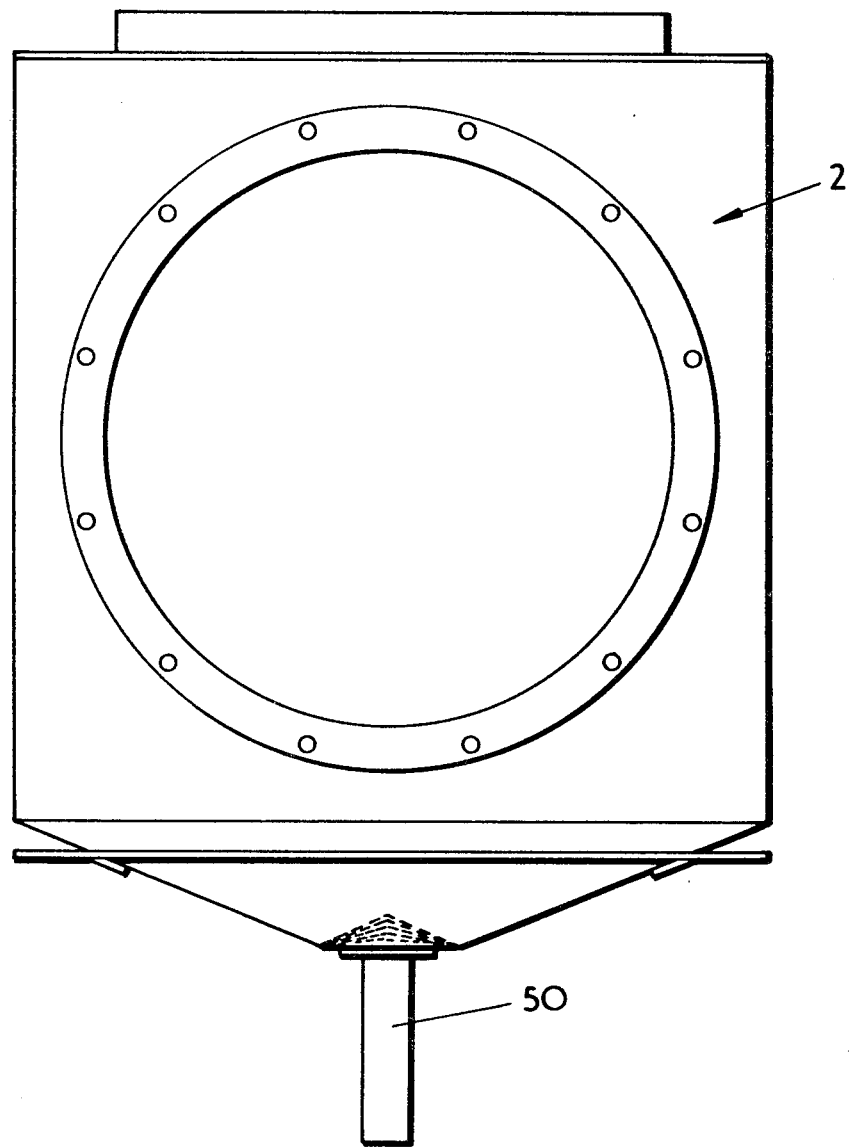
FIG. 5 is an end view of the detail of FIG. 4.
Figure 8:
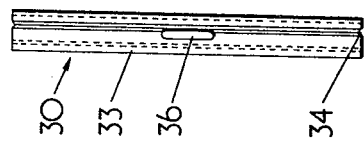
FIG. 8 is a side view of another detail of FIG. 2.
Figure 9:
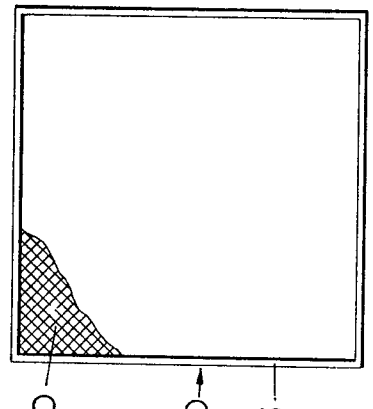
FIG. 9 is an incomplate front view of the detail of FIG. 8.
Figure 6:
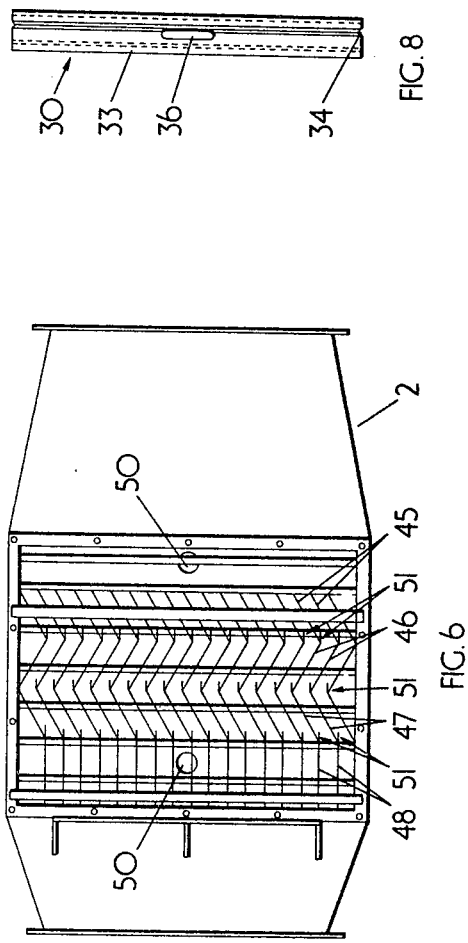
FIG. 6 is a sectional plan of the detail of FIG. 4.
Figure 7:
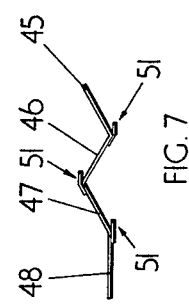
FIG. 7 is a detail of FIG. 6 shown on an enlarged scale.
Figure 10:
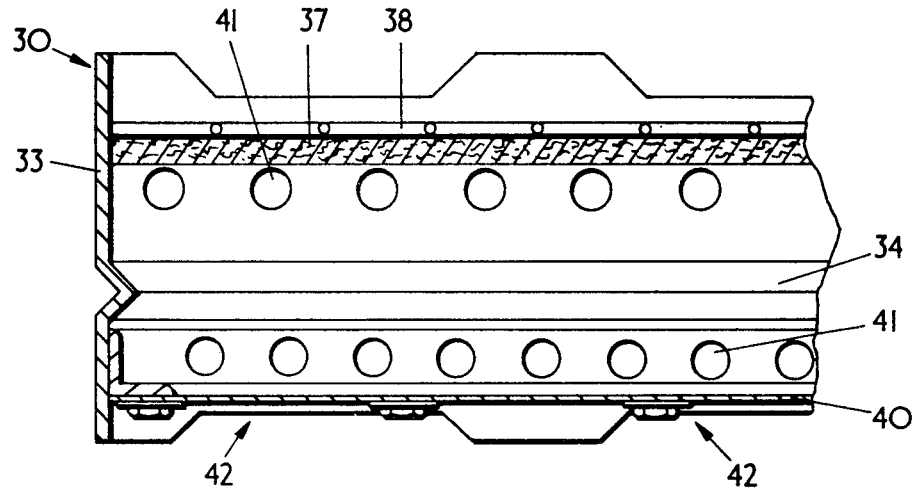
FIG. 10 is an incomplete sectional plan of the details of FIG. 8.
Figure 11:
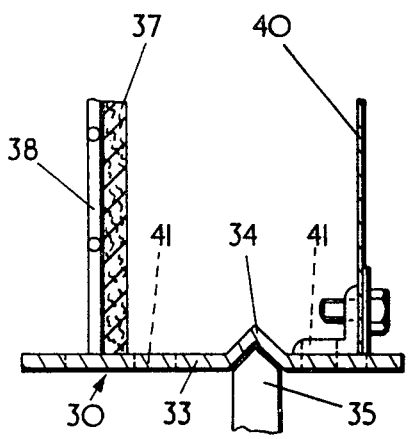
FIG. 11 is an incomplete sectional side view of the detail of FIG. 8.

The catchment plate assemblies 44 are shown in more detail in FIGS. 4, 5 and 6. Each catchment plate assembly comprises a series of inclined plate sections 45, 46, 47 and a final inline guide plate section 48. Each of the inclined plates 45, 46 and 47 is provided with a water trap 51. In use, the moist air flow leaving the mat filter has to travel along the tortuous paths formed by the catchment plate assemblies. Upon the direction of air flow being changed, due to the inclined plate sections, the water droplets which are denser than air are more likely to keep in a straight path and therefore tend to be trapped. The procedure is repeated by each inclined plate section until by the time the air flow reaches the inline plate sections 48 it is substantially free from water droplets. The inline plate sections 48 tend to direct the air flow along the duct.

The fibrous mat filter 37 acts to agglomerate the fine water droplets incident on the filter so that relatively large drops of water are carried by the air flow leaving the filter. These relatively large drops can be efficiently collected by the relatively low resistance catchment plate assemblies 44.

Drain pipes 50 are provided in the bottom of the chamber 2 adjacent to the filter unit 30 and catchment plate assemblies 44 to feed the dust containing water towards the floor of the settling tank 12.

In operation, the dust filter apparatus is installed in an underground working and extension ducting extends from the apparatus towards a working face or conveyor transfer station. The filter unit is assembled on its slideway and located across the air flow duct. The doors 31 are securely closed and the drive motor 6 switched on to simultaneously drive the fan and the pump to induce an air flow along the duct and to spray water into the air flowing through the fan. The water tends to pass through the pre-filter 40 and collects on the fibrous mat filter 37. As explained previously a large proportion of the water flows freely down the mat filter throughout the whole of its thickness. A portion of the water is carried by the air flow from the mat filter towards the catchment plate assemblies where it is caught in the water traps 51 as previously explained. Any wetted dust particles carried by the air flow towards the catchment plate assemblies are discharged with the water into the settling tank.

The water is collected in the settling tank 12 and recirculated through the nozzles 16 via the pump 11.

The air flow induced along the ducting will extract dust particles from the dust source and carry them along through the fan to the filter unit 30. The pre-filter 40 will collect any relatively large dust particles which thereby fall into the settling tank 12 via the recesses 42 formed in the base of the frame 33 and drain pipe 50.

The remainder of the dust particles are carried to the fibrous mat filter 37 where they are wetted by contact with the relatively thick, continuous body of water flowing through the mat filter. Since the water throughout the thickness of the filter is flowing at a relatively high velocity the collected wetted dust particles tend to be continuously washed off the mat filter and into the settling tank 12 via drain pipes 50.

Since the dust particles are continuously and efficiently washed off the mat filter is not necessary for the filter to be changed frequently. The only servicing which has to be carried out is the infrequent cleaning of the settling tank 12. This is simply and quickly achieved by stopping the drive motor 6 opening the discharge valve 25 to allow dirty water to drain from the settling tank. As soon as the water level falls below a preselected level the control valve 18 is actuated by the ball 19 to feed water into the tank through the discharge pipes 21. The ends of the discharge pipes 21 are adapted to provide fan shaped sprays which scour the floor 23 of the tank to urge the settled dust towards the discharge valve 25. Thus the settling tank 12 is quickly and easily cleaned and the dust filter apparatus ready for operation.

In a typical installation the cross-sectional area of the fibrous mat filter is approximately six square feet, the volume of the air flow is eight thousand cubic feet per minute and the pressure drop across the dust filter apparatus is five inches of water gauge. A typical volume of water used in five gallons per minute.

Owing to increasing amounts of air breaking through the body on the fibrous filter as air flow is increased, the resistance of the dust filter apparatus to air flow tends to be reduced at higher air volumes.

The reason for this is that water breaks away from the downstream facing surface of the mat filter and thus, at any instant of time there is less water present in the body of water on the filter at high air flow rates. This feature is due to the low fibre density of the filter which permits free flow of water through the whole thickness of the mat filter.

Consequently, the filter unit can be used over a wide range of air flow rates maintaining high dust collection efficiencies without excessive pressure drop.

In the typical example referred to above, the same filter unit can be used with an air volume of two thousand cubic feed per minute with a pressure drop of approximately two inches of water gauge.

With such conditions the dust filter apparatus provides a very efficient, simple and continuous dust filter which can operate efficiently throughout a range of air flows.

Figure 2:
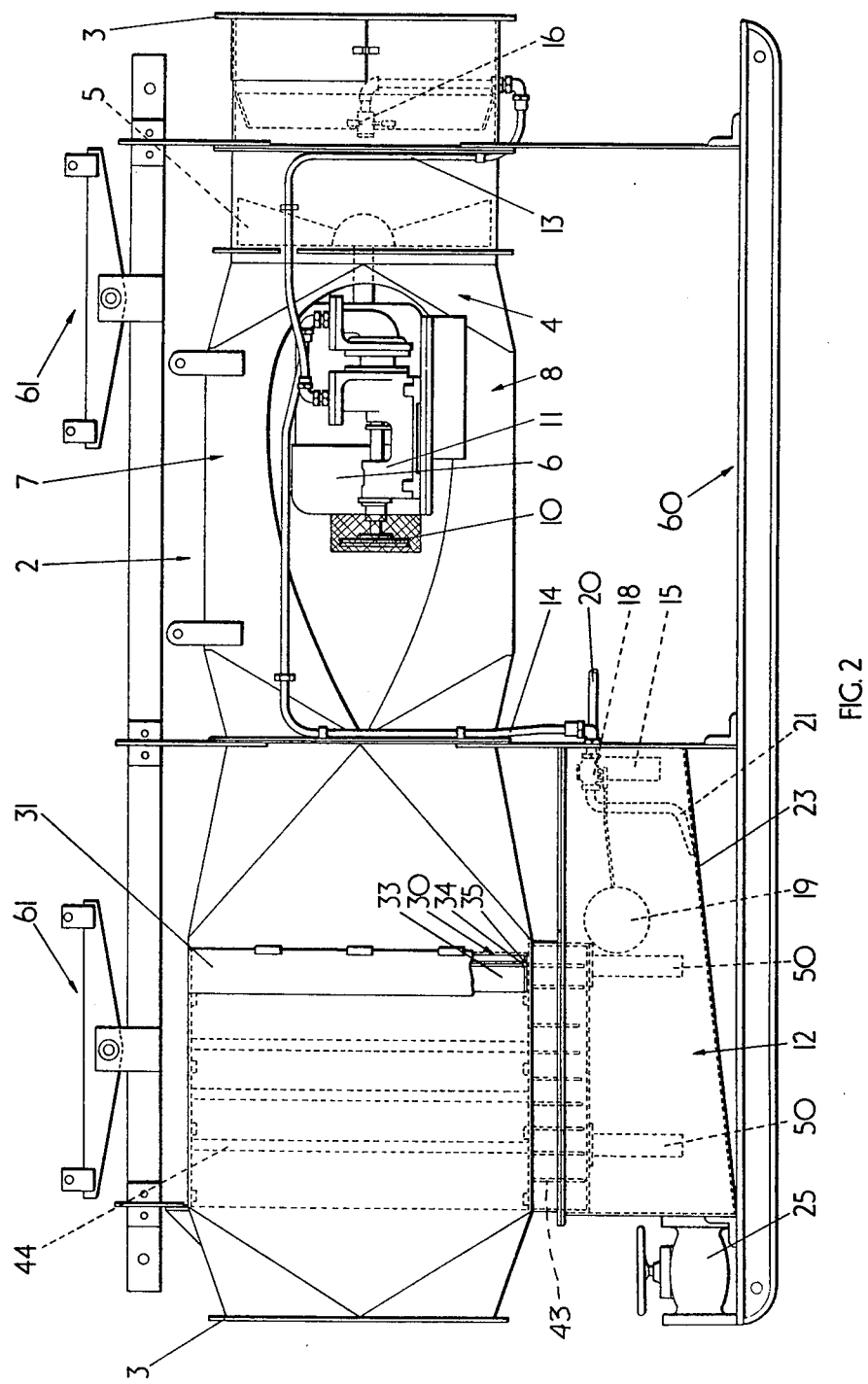
FIG. 2 is a side view of dust filter apparatus.
Figure 3:
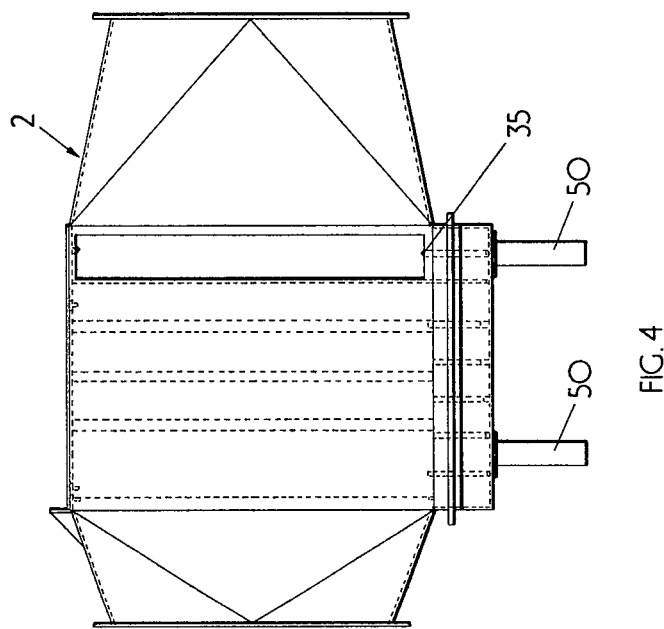
FIG. 3 is a front view of FIG. 2.

In FIGS. 2 and 3 of the drawings the dust filter apparatus is shown floor mounted on skids 60. The apparatus may be provided with monorail mounting equipment 61 for engagement with an overhead mono rail track system which permits easy movement of the apparatus as the position of the dust source varies.

In a modification of the invention the fan may be located downstream of the filter unit so as to draw air through the filter.

In further modifications of the invention the filter unit may comprise a plurality of over lapping mat filters.

In still further modifications the mat filter may be inclined across the air flow ducting.

I claim:

1. Dust filter apparatus comprising a hollow chamber, the chamber defining a gaseous flow duct having an inlet and outlet, a filter unit including a fibrous mat filter means arranged across the duct, and nozzle means in the duct for spraying liquid into the inlet of the gaseous flow duct on an upstream side of the mat filter means, fibers of the mat filter means being nondensely packed, the mat filter means having a low fibre density such that the mat filter tends not to retain the liquid by capillary action and permits flow of liquid throughout a thickness of the filter means in the directions parallel to, and transverse to, the direction of gaseous flow and having a low thickness such that the liquid from the nozzle means saturates the whole of the mat filter means, the arrangement being such that, in use, an effectively continuous body of flowing liquid is formed across the gaseous flow passage, the body of flowing liquid having a thickness virtually equal to the thickness of the mat filter means.

2. Apparatus as claimed in claim 1, in which the filter unit comprises a pre-filter located on the upstream side of the fibrous mat filter means between the inlet and the fibrous mat filter means downstream of the nozzle means.

3. Apparatus as claimed in claim 2, in which the fibrous mat filter means and the pre-filter are mounted in a frame.

4. Apparatus as claimed in claim 3, in which the frame engages in a slide arranged transversely to the gaseous flow duct.

5. Apparatus as claimed in claim 4, in which the frame has a formation which engages a formation on the slide to ensure correct assembly of the dust filter apparatus.

6. The dust filter apparatus of claim 1 further comprising gaseous flow inducing fan means intermediate the nozzle means and the filter unit for inducing gaseous flow in the duct.

7. Dust filter apparatus comprising a hollow chamber defining a gaseous flow duct having an inlet and outlet, a filter unit including a fibrous mat filter means arranged across the duct, and nozzle means in the duct for spraying liquid into the inlet of the gaseous flow duct on an upstream side of the mat filter means, the mat filter means having a low fibre density such that the mat filter means tends not to retain the liquid by capillary action and permits flow of liquid throughout a thickness of the filter in the directions parallel to, and transverse to, the direction of gaseous flow and having a thickness such that the liquid from the nozzle means saturates the whole of the mat filter means, the arrangement being such that, in use, an effectively continuous body of flowing liquid is formed across the gaseous flow passage, the body of flowing liquid having a thickness virtually equal to the thickness of the mat filter means, fan means for inducing the gaseous flow through the filter unit, and a sealed settling tank provided below the filter unit.

8. Apparatus as claimed in claim 7, comprising a pump having a suction pipe connected to the settling tank and having an outlet pipe connected to the nozzle means for recirculating liquid from the sealed settling tank to the nozzle means.

9. Apparatus as claimed in claim 8, in which the suction pipe section is provided in the settling tank for feeding liquid to the pump, a diameter of the suction pipe being sufficiently large such that, in use, collected coarse particles tend not to be carried by the flow of liquid along the suction pipe.

10. Apparatus as claimed in claim 9, in which the pump is drivably coupled to the fan drive.

11. The dust filter apparatus of claim 7 wherein the fan means is positioned in the duct intermediate the nozzle means and the filter unit for inducing gaseous flow in the duct.

12. Dust filter apparatus comprising a hollow chamber defining a gaseous flow duct having an inlet and outlet, a filter unit including a fibrous mat filter means arranged across the duct, and nozzle means in the duct for spraying liquid into the inlet of the gaseous flow duct on an upstream side of the mat filter means, the mat filter means having a fibre density such that the mat filter means tends not to retain the liquid by capillary action and permits flow of liquid throughout a thickness of the filter in the directions parallel to, and transverse to, the direction of gaseous flow and having a thickness such that the liquid from the nozzle means saturates the whole of the mat filter means, the arrangement being such that, in use, an effectively continuous body of flowing liquid is formed across the gaseous flow passage, the body of flowing liquid having a thickness virtually equal to the thickness of the mat filter means, fan means for inducing flow through the filter unit, a sealed settling tank provided below the filter unit, and means for maintaining the level of liquid in the settling tank to a preselected level.

13. Apparatus as claimed in claim 12, in which the said means for maintaining the level comprises a valve which is connected to a liquid supply and which opens when the liquid level in the settling tank falls below a preselected level.

14. Apparatus as claimed in claim 13, in which the control valve feeds liquid into the settling tank through a pipe, at least the discharge portion of which extends in a direction along a floor of the settling tank so that, in use, liquid fed into the settling tank from the liquid supply scours the floor and urges dust particles which have settled on the floor towards discharge means for the removal of the collected dust particles.

15. Dust filter apparatus comprising a hollow chamber defining a gaseous flow duct having an inlet and outlet, a filter unit including a fibrous mat filter means arranged across the duct, and nozzle means in the duct for spraying liquid into the inlet of the gaseous flow duct on an upstream side of the mat filter means, the mat filter means having a fiber density such that the mat filter means tends not to retain the liquid by capillary action and permits flow of liquid throughout a thickness of the filter in the directions parallel to, and transverse to, the direction of gaseous flow and having a thickness such that the liquid from the nozzle means saturates the whole of the mat filter means, the arrangement being such that, in use, an effectively continuous body of flowing liquid is formed across the gaseous flow passage, the body of flowing liquid having a thickness virtually equal to the thickness of the mat filter means, and means on the downstream side of the mat filter for removing liquid from the filtered air flow.

16. The dust filter apparatus of claim 15 further comprising gaseous flow inducing means intermediate the nozzle means and the filter unit for inducing gaseous flow in the duct.

* * * * *